United States Patent [19]

Ichihashi

[11] Patent Number: 5,838,718
[45] Date of Patent: Nov. 17, 1998

[54] METHOD AND APPARATUS FOR TRANSMITTING DATA SIGNALS

[75] Inventor: Toshihiro Ichihashi, Tokyo, Japan

[73] Assignee: Kokusai Electric Co., Ltd., Tokyo, Japan

[21] Appl. No.: 661,965

[22] Filed: Jun. 12, 1996

[30] Foreign Application Priority Data

Jun. 13, 1995 [JP] Japan ................................ 7-146448

[51] Int. Cl.$^6$ .......................... H04B 15/00; H04K 1/00; H04L 27/30
[52] U.S. Cl. .................. 375/202; 375/200; 370/320; 370/335; 370/342; 370/441
[58] Field of Search .................... 370/320, 335, 370/342, 296, 441; 375/200, 202, 216, 219, 260

[56] References Cited

U.S. PATENT DOCUMENTS

| | | | |
|---|---|---|---|
| 5,394,433 | 2/1995 | Bantz et al. | 375/202 |
| 5,459,759 | 10/1995 | Schilling | 375/202 |
| 5,606,552 | 2/1997 | Baldwin et al. | 370/474 |
| 5,644,576 | 7/1997 | Bauchot et al. | 370/437 |
| 5,657,343 | 8/1997 | Schilling | 375/202 |

*Primary Examiner*—Chi H. Pham
*Assistant Examiner*—Emmanuel Bayard
*Attorney, Agent, or Firm*—Greenblum & Bernstein, P.L.C.

[57] ABSTRACT

Method and apparatus for transmitting data. Digital image data is converted into image data packets, and digital audio data is converted into audio data packets, the packets being transmitted by a spread spectrum-frequency hopping (SS-FH) sending and receiving device. A bi-directional audio transmission is performed, independently of a image transmission direction, by switching between a sending mode and a receiving mode of the SS-FH sending and receiving device for selected time periods.

20 Claims, 6 Drawing Sheets

METHOD AND APPARATUS FOR TRANSMITTING DATA SIGNALS

BACKGROUND OF THE INVENTION

1. Field of the Invention

The present invention is directed to a method and apparatus for transmitting digitized audio and image data using a SS-FH (spread spectrum-frequency hopping) transmission scheme.

2. Description of the Prior Art

A block diagram of an example of a conventional data transmitting device is illustrated in FIG. 5. According to this example, image signals captured by a television camera 11 are inputted to an image signal-digital data conversion unit 12, in which the image signals are converted into digital image data through an A/D converter and are compressed.

Audio signals captured by a microphone 21 are inputted to an audio signal A/D conversion unit 22, in which the audio signals are converted into digital audio data. The digital image data and the digital audio data are then input to a packet assemble unit 13, in which the digital image data and the digital audio data are converted into data packets. The data packets are modulated with a high frequency signal by a SS-FH (spread spectrum-frequency hopping) modulation and sending unit 14 and are transmitted. Control unit 15 supplies signals, such as clock signals, timing signals and other required needed signals to respective units 12 through 14 and 22.

The data packets, modulated with the high frequency signals, are received by a SS-FH receiving and demodulation unit 16, in which the modulated data packets are demodulated into data packets. The demodulated data packets are inputted to a packet de-assemble unit 17, in which the demodulated packets are divided into digital image data and digital audio data. The digital image data is input to a digital data image signal conversion unit 18, in which the digital image data is expanded and converted into image signals by D/A conversion. The image signals are then supplied to a television receiving device 19, in which the image is reproduced according to the image signals.

The digital audio data is inputted to an audio signal D/A conversion unit 23, in which the digital audio data is converted to analog signals. The audio signals are then inputted to a speaker 24 to be reproduced.

A control unit 20 on the receiving side supplies signals, such as, for example, clock signals, timing signals and other required or needed signals, to the respective units 16 through 18 and 23.

A block diagram of a second example of a conventional device is illustrated in FIG. 6. In the second example, a pair of data transmission equipment (or arrangements) A and B are set up at two locations which are spaced a distance apart from each other. Each data transmission apparatus (or equipment) A and B has selective sending/receiving facilities (capabilities). The sending/receiving modes are determined by sending/receiving changing switches 6A and 6B.

For example, when the sending/receiving changing switch 6A on the A side is set to a sending mode while the sending/receiving changing switch 6B on the B side is set to a receiving mode, image signal-digital image data conversion unit 3A on the A side converts image signals from television camera 1A into digital image data, which are outputted to a packet assemble and de-assemble unit 4A.

On the other hand, audio signal A/D and D/A converting unit 10A converts audio signals captured by microphone 8A into digital audio data, which are outputted to a packet assemble and de-assemble unit 4A.

The digital image data and the digital audio data are converted into data packets by the packet assemble and de-assemble unit 4A. The packets are modulated with high frequency signals by a SS-FH sending/receiving unit 5A, and are transmitted to data transmission equipment B.

The data transmission apparatus of the second example includes a control unit 7A that supplies signals, such as, for example, clock signals, timing signals and other required signals, which are enable the operation of the transmission mode by the sending/receiving changing switch 6A, to the respective units 3A through 5A and 10A.

A SS-FH sending/receiving unit 5B associated with the B side receives the data packets modulated with high frequency signals transmitted by the SS-FH sending/receiving unit 5A on the A side. The SS-FH sending/receiving unit 5B on the B side demodulates the modulated high frequency signals to produce data packets, which are outputted to a packet assemble and de-assemble unit 4B.

The data packets are divided into digital image data and digital audio data in the packet assemble and de-assemble unit 4B. The digital image data is outputted to an image signal-digital data conversion unit 3B, while the digital audio data is outputted to an audio signal A/D and D/A converting unit 10B.

Image signal-digital data conversion unit 3B converts the digital image data into image signals that are suitable for input to a television receiving device 2B, and outputs the image signals to the television receiving device 2B. Audio signal A/D and D/A converting unit 10B converts the digital audio data into audio signal, which is reproduced by speaker 9B.

Control unit 7B supplies signals, such as, for example, clock signals, timing signals and other required signals, that are required to enable the operation of the receiving mode, set by the sending/receiving changing switch 6B, to respective units 3B through 5B and 10B.

In the second example, when the sending mode is set by the sending/receiving changing switch unit 6A on the A side and the receiving mode is set by the sending/receiving changing switch unit 6B on the B side, images captured by television camera 1A on the A side can be viewed on the television receiver 2B on the B side. Further, audio signals captured by microphone 8A on the A side can be reproduced on speaker 9B on the B side.

Further, when the sending/receiving changing switch unit 6A is set to the receiving mode on the A side and the sending/receiving changing switch unit 6B is set to the sending mode on the B side, image signals captured by television camera 1B on the B side can be viewed on television receiver 2A on the A side, while audio (e.g., voice) signals captured by microphone 8B on the B side are reproduced on speaker 9A on the A side.

The device shown in FIG. 5 differs from the device shown in FIG. 6 in that the transmitting direction of image data in the device of FIG. 5 is in a single direction, while the transmitting direction of image data in the device of FIG. 6 is two directional (e.g., selectively changeable between the A side and the B side).

However, the above-mentioned examples have a problem in that when the transmission of image signals by the SS-FH scheme is performed between two locations that are distant from each other, the transmission of an audio signal is possible only in the same direction as that of the transmission of the image signal. Thus, it is not possible with the above-discussed examples to confirm the transmission mode by communicating between the two locations.

BRIEF SUMMARY OF THE INVENTION

Accordingly, it is an object of the present invention to provide a method and apparatus for transmitting data signals, in which it is possible to communicate between two locations using an audio signal, regardless of the transmission direction of the image data, so that it is possible to audibly confirm a transmission mode.

Another object of the present invention is to provide a data transmission device in which an exchange of audio signals is possible regardless of the transmission direction of the image data, so that the state of a transmission mode can be audibly confirmed.

In order to achieve the objects and advantages of the present invention, a method is provided for transmitting data signals, in which a one-way image transmission is performed using a SS-FH (spread spectrum-frequency hopping) radio transmission technique, in which packet slots are provided for bi-directional audio data packets on a part of a transmission line for transmitting image data packets. Each packet is synchronizingly transmitted with a hopping channel of the SS-FH radio sending and receiving device, in which the bi-directional audio transmission is performed independently of a one-way image transmission, based upon a setting of a sending/receiving mode of the SS-FH radio sending and receiving device for a predetermined given period of time in the transmission line.

Further, a method is disclosed for transmitting data in which digital image data is converted into image data packets. The image data packets are transmitted by a SS-FH radio sending and receiving device. Both digital audio data and digital image data are converted into packets, and the packets are synchronizingly transmitted with a hopping channel by the SS-FH sending and receiving device. A bi-directional audio transmission is performed, independently of the transmission direction of the image transmission, by selecting a sending/receiving mode of the SS-FH radio sending and receiving device. The sending/receiving mode is selected for a predetermined transmitting period.

According to the present invention, a data transmission device comprises a packet assemble and de-assemble unit that converts digital image data to image data packets, and converts image data packets to digital image data. A SS-FH sending/receiving unit modulates and sends image data packets, and receives and demodulates modulated image data packets. A sending/receiving changing switch unit switches a sending/receiving mode; i.e., between sending and receiving modes. The data transmission device is provided with an audio signal A/D and D/A converting unit that converts analog audio signals into digital audio data and converts digital audio signals into analog audio signals. The packet assemble and de-assemble unit converts digital audio data into bi-directional data packets and converts bi-directional data packets into digital audio data, independently of the image transmission.

Further, the present invention discloses a data transmission device comprising an image pickup camera for capturing images of a subject and outputting image signals corresponding to the captured images, an image reproducing device for reproducing the image of the subject according to the image signals, and an image signal-digital data conversion unit for converting between image signals and digital image data. A packet assemble and de-assemble unit is provided for converting digital image data to image data packets and for converting image data packets to digital image data, together with a SS-FH sending/receiving unit for modulating and sending the image data packets and for receiving and demodulating modulated image data packets, and a sending/receiving changing switch unit for selecting a sending/receiving mode. The data transmission device is provided with a first converter that converts a voice (or other sound) into audio signals, a second converter that converts audio signals into voice (or other sound), and an audio signal A/D and D/A converting unit that converts audio signals to digital audio data and vice versa. The packet assemble and de-assemble unit additionally converts digital audio data to/from bi-directional data packets, independently of the image transmission.

In order to achieve the object of the present invention, an apparatus is provided comprising sending/receiving changing switch for selecting a sending mode and a receiving mode. An image pickup camera, an image reproducing device, and an image signal-digital data conversion device operate in a transmission mode (set by the sending/receiving changing switch) to selectively convert image signals obtained from the image pickup camera into digital image data, compress the digital image data, and selectively expand the digital image data sent from a packet assemble and de-assemble unit, converting the expanded data into signals adapted for inputting to an image reproducing device.

In a reception mode (set by the sending/receiving changing switch), the packet assemble and de-assemble unit (means) selectively generates image data packets from the digital image data sent from the image signal-digital data conversion device splits the digital image data into segments, converts a transmission rate and adds a preamble, unique words, calling code, and error-correcting code, to selectively generate continuous digital image data from image data packets which are received and demodulated in a SH-FH sending/receiving device. The preamble, unique words, calling code, and error-correcting code from the image data packets are separated, and processing of error-correcting and converting a transmission rate occurs. The SS-FH sending/receiving device, in accordance with an operation mode determined by the sending/receiving changing switch means, selectively modulates the image data packets from the packet assemble and de-assemble unit (means) and sent by a SS-FH method, and selectively receives and demodulates the image data packet modulated with high frequency signals. A control unit is provided for generating clock signals and timing signals required for image sending and image receiving according to setting of the sending/receiving changing switch. A first converter means converts a voice signal into audio signals. A second converter means converts the audio signals into a voice signal. An audio signal A/D and D/A converting apparatus simultaneously converts the audio signals into digital audio data and selectively converts digital audio data into audio signals, respectively. The packet assemble and de-assemble unit further includes facilities for generating and separating audio data packets, while the control unit further includes facilities for generating signals, such as, for example, clock signals and control signals needed for audio signal A/D conversion, D/A conversion and facilities of audio signal data packet assemble and de-assemble.

In the present invention, when an image is sent from one data transmission device (equipment) to an other data transmission device (equipment), image signals are outputted from an image pickup camera to an image signal-digital data conversion unit, in which the image signals are converted into digital image data. On the other hand, audio signals are outputted from a voice-electric converter (e.g., microphone) to an audio signal A/D and D/A converting unit, in which the audio signals are converted into digital audio data. The digital image data and the digital audio data are sent to a packet assemble and de-assemble unit, in which the digital image data and the digital audio data are converted into image data packets and audio data packets, which are modulated and thereafter transmitted from one data transmission device to the other data transmission device using a SS-FH sending/receiving unit.

Data signals that are transmitted from the other data transmission device are received and demodulated into audio data packets in a SS-FH sending/receiving unit. The audio data packets are sent to a packet assemble and de-assemble unit, in which the digital audio data is separated from the audio data packets. The digital audio data is sent to an audio signal A/D and D/A converting unit, in which the digital audio data is converted into an audio signal. The audio signal is then converted into a voice signal via an electric-voice converter (e.g., speaker).

When an image sent from the other data transmission device is received by the one data transmission device, data signals transmitted from the other transmission device are received by the SS-FH sending/receiving unit of the one data transmission device, in which the data signals are demodulated into image data packets and audio data packets. These packets are sent to the packet assemble and de-assemble unit, in which digital image data and digital audio data are separated from each other. The digital image data is sent to the image signal-digital data conversion unit, in which the digital image data is converted into image signals. The image signals are sent to an image reproducing device, in which an image is reproduced according to the image signals. Further, the digital audio data is sent to the audio signal A/D and D/A converting unit, in which the digital audio data is converted into audio signals. The audio signals are converted into the voice signal through the electric-voice converter (e.g., speaker).

In such a manner, while image signals are transmitted in only one direction (from either one data transmission device to the other data transmission device, or vice versa), audio signals used, e.g., for confirming the setting of the sending and receiving modes, the start and finish of transmission of image signals or the state of the transmission are bi-directionally transmitted.

According to the present invention, an apparatus is disclosed for exchanging data signals, comprising means for converting an image signal into a digital image data, means for converting an audio signal into digital audio data, means for generating data packets from the digital image data and the digital audio data, means for transmitting the data packets to another apparatus at a location different from a location of the apparatus, and means for receiving data packets transmitted by the another apparatus, wherein the data packets comprising the digital image data is transmitted in only one direction, while data packets comprising the digital audio data is bi-directionally transmitted.

According to an advantage of the present invention, a camera captures an object of a subject and outputs the image signal corresponding to the captured object. Similarly, a microphone captures a voice and outputs the audio signal corresponding to the voice. A speaker reproduces the data packet received by the another apparatus to convert it into an audible signal.

A feature of the instant invention resides in the transmitting means and the receiving means comprising a sending/receiving unit. In the preferred embodiment, the sending/receiving unit comprises a spread spectrum-frequency hopping mode that transmits and receives data packets.

Another feature of the present embodiment resides in the use of a controller that controls operations of the image signal converting means, the audio signal converting means, the data packets generating means, the transmitting means and the receiving means.

Another feature of the present invention relates to the audio signal converting means, which further comprises means for converting digital audio data received from the another apparatus into audio data. The data packets generating means further comprises means for separating digital image data and digital audio data from data packets received from the another apparatus.

According to the present invention, a method is disclosed for exchanging data between a first apparatus that is located at a first location and at least one other apparatus that is located at a location that differs from said first location. The method comprising the steps of packetizing audio data and image data obtained by the first apparatus into data packets, transmitting the data packets to the at least one other apparatus, and receiving data packets, containing audio data, from the at least one other apparatus so that a two-directional audio communication takes place.

According to an advantage of the instant invention, the step of transmitting data packets comprises transmitting data packets using a spread-spectrum-frequency hopping transmission scheme, which may be implemented using a spread spectrum-frequency hopping modem.

According to another advantage, a microphone is used to capture a spoken voice and output the audio data, and a speaker is used to reproduce the audio data received from the at least one other apparatus.

A feature of the method of the present invention resides in the step of selectively switching the apparatus between a transmission mode and a reception mode at predetermined time slots so that the data packets, containing audio data, may be received while the packetized audio data and image data are transmitted by the apparatus.

According to another feature of the method of the instant invention, the image data is converted into digital image data, and the audio data is converted into digital audio data, wherein the digital image data and digital audio data are packetized into the data packets.

The present disclosure relates to subject matter contained in Japanese Patent Application No. HEI 7-146448 (filed on Jun. 13, 1995), which is expressly incorporated herein by reference in its entirety.

BRIEF DESCRIPTION OF THE DRAWING

The foregoing and other objects, features and advantages of the invention will be apparent from the following more particular description of a preferred embodiment, as illustrated in the accompanying drawings, which are presented as a non-limiting example, in which reference characters refer to the same parts throughout the various views, and wherein.

DETAILED DESCRIPTION

A preferred embodiment of the present invention will be described below.

Figure 1:
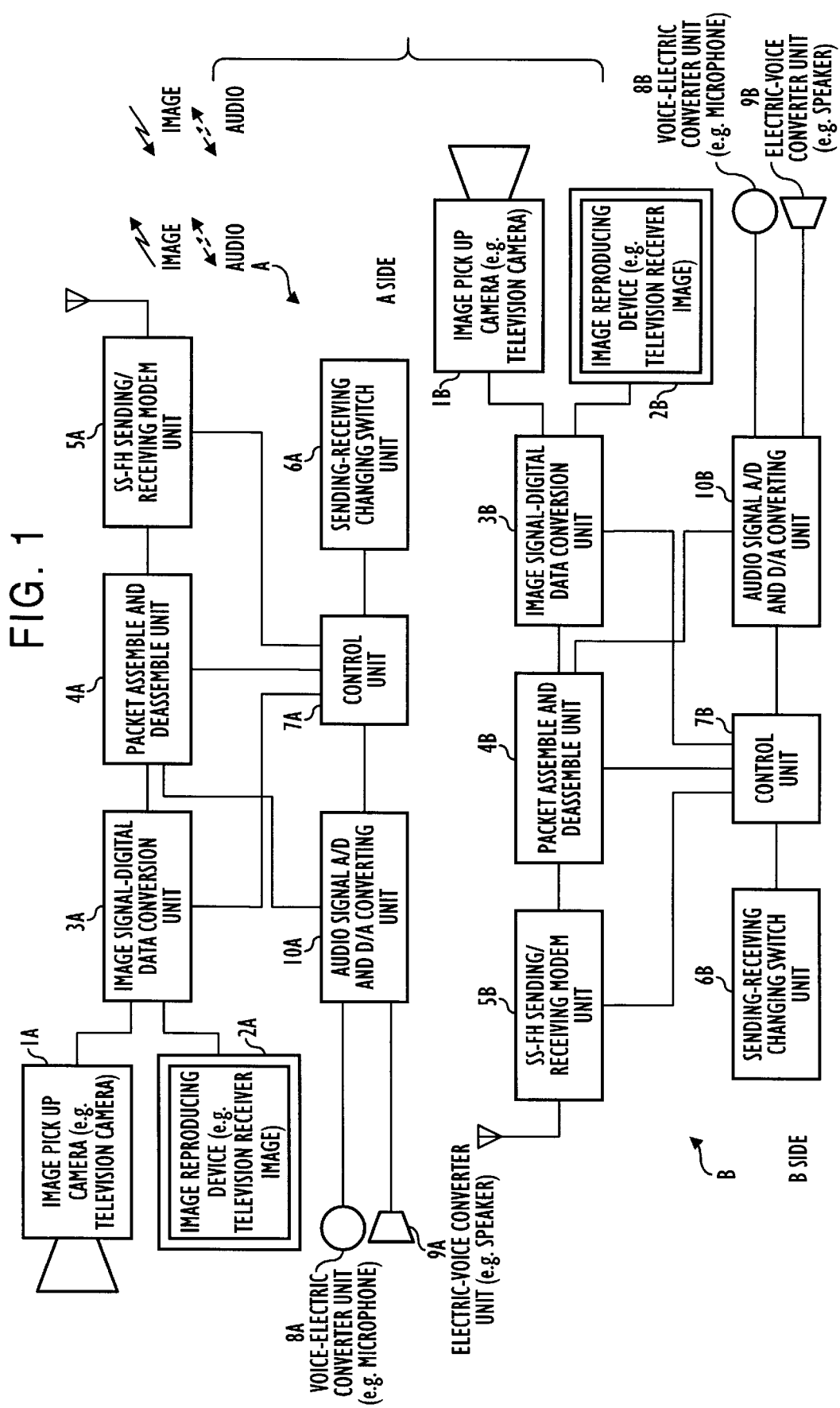
FIG. 1 is an illustration of a block diagram of a preferred embodiment of a data transmission device of the present invention.

FIG. 1 is a block diagram illustrating a preferred embodiment of the present invention. The present invention includes at least a first data transmission equipment (data transmission device) A and a second data transmission equipment (data transmission device) B. Image signals outputted from one television camera 1A or 1B of one of the at least two data transmission devices A and B is transmitted to the other of the at least two data transmission devices A and B. In addition, audio signals are exchanged between the at least two data transmission devices A and B independently of the image signal transmission, via microphones 8A and 8B, speakers 9A and 9B, audio signal A/D and D/A converting units 10A and 10B, packet assemble and de-assemble units 4A and 4B and control units 7A and 7B. Thus, a bi-directional telephonic communication can take place regardless of the transmission direction of the image signals, or status set by sending/receiving changing switch units 6A and 6B.

The present invention comprises at least two substantially identical (functionally and structurally) data transmission equipments (or devices), comprising a plurality of elements #A and #B, where # denotes an element number and "A" denotes that the element is associated with the first data transmission device located at a first location and "B" denotes that the element is associated with the second data transmission device located at a second location. In the disclosed embodiment, two television cameras 1A and 1B, two television image receivers 2A and 2B, two image signal-digital data conversion units 3A and 3B, two packet assemble and de-assemble units 4A and 4B, two SS-FH (spread spectrum-frequency hopping) sending/receiving units 5A and 5B, two microphones 8A and 8B, two speakers 9A and 9B, two audio signal A/D and D/A converting units 10A and 10B, two control units 7A and 7B, and two sending/receiving changing switch units 6A and 6B are employed. Each data transmission device has the same elements and operates in the same manner as an other data transmission device.

Television cameras 1A and 1B convert visual information regarding a subject into image signals corresponding to the subject information. Image reproducing devices (television image receivers) 2A and 2B convert image signals from the image signal-digital data conversion units 3A and 3B into a video picture. When transmitting an image signal, the appropriate image signal-digital data conversion unit 3A or 3B receives the signals from the associated television cameras 1A or 1B, and converts the signal into compressed digital image data. When an image is being received, digital image data sent from an appropriate packet assemble and de-assemble unit 4A or 4B is expanded, converted from a digital signal to an analog signal, etc., and inputted into the associated television 2A or 2B.

When sending an image, both digital image data sent from the image signal-digital data conversion units 3A, 3B and digital audio data outputted from the audio data signal A/D and D/A converting units 10A, 10B are split into segments in respective packet assemble and de-assemble units 4A and 4B. The data transmission rate of the split data is converted, and thereafter, supplemental data, such as a preamble, unique word, calling code, error-correcting code and other necessary signals are added to the split and converted data. The rate-converted data with the added supplemental data is outputted as packets to the appropriate SS-FH sending/receiving units 5A or 5B, and at regular timing intervals, the audio data packets sent from the SS-FH sending/receiving units 5A or 5B are separated from the supplemental data added to the split data when generating packets, the separated data being checked using, for example, an error correcting method. The data transmission rate is converted, and thereafter, the rate-converted data is outputted as continuous digital audio data to the appropriate audio signal A/D and D/A converting unit 10A or 10B.

On the other hand, when receiving an image, image data packets and audio data packets exchanged between the SS-FH sending/receiving units 5A and 5B are separated from the supplemental data that was added to the image data packets and the audio data packets when the packets were generated. The separated data is checked, using, for example, an error correcting method. Thereafter, the data transmission rate of the data is converted, and the rate-converted data is outputted as continuous digital image data and continuous digital audio data to the image signal-digital data conversion units 3A, 3B and to the audio signal A/D and D/A converting units 10A, 10B, respectively.

Further, digital audio data outputted from the signal A/D and D/A conversion units 10A, 10B are split into segments at regular timing intervals. The data transmission rate of the split data is converted, so that supplemental data, such as, for example, a preamble, unique word, calling code and/or error-correcting code is added to the split and rate-converted data. The rate-converted data with the added supplemental data is then output as packets to the appropriate SS-FH sending/receiving units 5A, 5B.

When sending an image, the appropriate SS-FH sending/receiving units 5A, 5B modulate and send the image data packets and the associated audio data packets obtained from the packet assemble and de-assemble units 4A, 4B. Further, the appropriate SS-FH sending/receiving units 5A, 5B is switched to the receiving mode (side) at regular timing intervals, in response to timing signals issued by the control units 7A, 7B, so that audio data packets that have been modulated to high frequency signals and exchanged between the two SS-FH sending/receiving units 5B, 5A are received and demodulated at regular timing intervals.

When an image signal is received, the received image data packets and audio data packets that have been modulated with high frequency signals by the appropriate SS-FH sending/receiving units 5B, 5A are demodulated by the SS-FH sending/receiving units 5A, 5B. The demodulated image data packet and the demodulated audio data packet are then output to the associated packet assemble and de-assemble unit 4A or 4B. It is noted that the SS-FH sending/receiving units 5A, 5B are selectively switched to the sending mode (side), in response to the timing signals issued by the control units 7A, 7B at regular timing intervals, so that the audio data packets from the packet assemble and de-assemble units 4A, 4B can be modulated and transmitted.

Microphones 8A and 8B function to convert voice or other sound signals into audio signals and send the audio signals to the appropriate audio signal A/D and D/A converting units 10A, 10B. Speakers 9A, 9B reproduce voice or other sound signals, based upon signals outputted from the appropriate audio signal A/D and D/A converting units 10A, 10B.

The audio signal A/D and D/A converting units 10A, 10B convert audio signals captured from their respective microphones 8A, 8B into digital audio data, which is inputted to the associated packet assemble and de-assemble units 4A, 4B for transmission to the other (e.g. second) location. When an audio signal is to be received, the audio signal A/D and D/A converting units 10A, 10B operate to receive continuous digital audio data from their associated packet assemble and de-assemble units 4A, 4B, which is converted into audio signals to be reproduced by associated speaker 9A, 9B. Thus, a two-way conversation is continuously performed during a data communication.

The control units 7A, 7B supply, based upon the setting of the sending/receiving changing switch units 6A and 6B, appropriate clock signals, timing signals and other signals required for the operation of the image signal-digital data conversion units 3A, 3B, the packet assemble and de-assemble unit 4A, 4B, the SS-FH sending/receiving units 5A, 5B, and the audio signal A/D and D/A converting units 10A, 10B.

The sending/receiving changing switch units 6A and 6B set the data transmission devices A and B to one of an image data transmission mode and an image data reception mode.

A description of a data transmission will now be provided, in which it is assumed that data transmission device A in FIG. 1 is operating in an image-sending mode, and data transmission device B is operating in an image-receiving mode.

Audio signals captured by microphone 8A are inputted to audio signal A/D and D/A converting unit 10A to be converted into digital audio data, independent of the transmission of an image signal. Then, the digital audio data is converted into audio data packets, in the same manner as the image data packets, by the packet assemble and de-assemble unit 4A. Thereafter, while the audio data packets are inserted in front or rear locations within strings of the digital image data packets, and the audio data packets are sent from the image-sending side (e.g., data transmission device A) to the image-receiving side (e.g., data transmission device B).

The packets are received and demodulated via the SS-FH sending/receiving unit 5B on the image-receiving side (e.g., data transmission device B), and inputted to the packet assemble and de-assemble unit 4B to separate the audio and image data. The separated audio signal (i.e., the continuous audio data output from the packet assemble and de-assemble unit 4B) is inputted to the audio signal A/D and D/A converting unit 10B to be D/A converted, in order to be reproduced by speaker 9B.

Further, on the image-receiving side (e.g., data transmission device B), audio signals captured by microphone 8B are inputted to the audio signal A/D and D/A converting unit 10B to be converted to digital audio data, and then converted to audio data packets in the packet assemble and de-assemble unit 4B. Thereafter, under the control of the control unit 7B, the SS-FH sending/receiving unit 5B is switched to the sending mode, so that the audio data packets are synchronized with a hopping channel associated with the SS-FH sending/receiving unit, for a certain period of time, at predetermined timing, so that the audio data packets modulated with high frequency signals are sent to the image-sending side (e.g., data transmission side A).

The audio data packets are received on the image-sending side, and are demodulated, so that the demodulated audio data is outputted by the packet assemble and de-assemble unit 4A as continuous digital audio data. The continuous digital audio data is then converted to an analog signal by the audio signal A/D and D/A converting unit 10A, so that the voice signal or other sound signal is reproduced by speaker 9A. Since a bi-directional transmission of audio signals is performed, a bi-directional audio communication is possible regardless of the transmission direction of an image signal.

Figure 2:
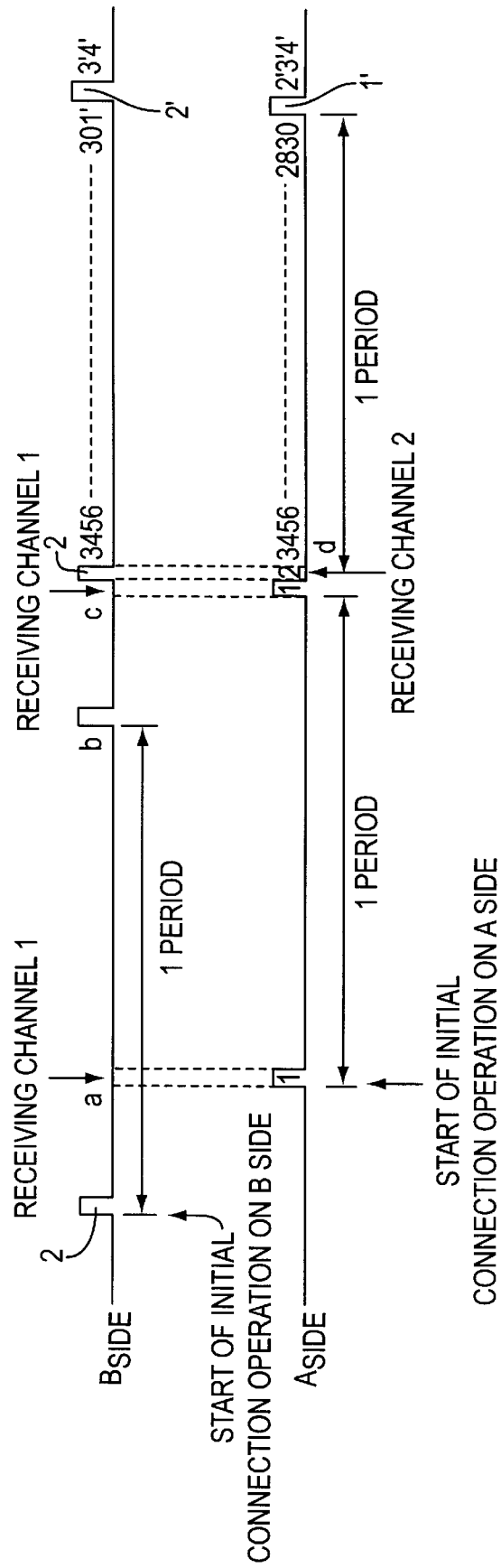
FIG. 2 illustrates handshaking signals of the invention illustrated in FIG. 1.

FIG. 2 schematically illustrates an example of a handshaking procedure that is performed by the data transmission device of the present invention to establish an initial connection. It is understood that alternative handshaking procedures/methods may be employed without departing from the spirit and/or scope of the present invention.

For purposes of explaining the handshaking procedure illustrated in FIG. 2, assume both data transmission devices A and B have their respective sending/receiving changing switches 6A, 6B set to the receiving mode (side), a sending/receiving channel for an initial connection has previously been set, and hopping patterns of the sending/receiving of the SS-FH sending/receiving units 5A, 5B agree with each other.

Further, assume that in the case of an initial connection being made, a sending channel associated with the data transmission device A is "1", a waiting channel associated with the data transmission device A is "2", a sending channel associated with the data transmission device B is "2", and a waiting channel associated with the data transmission device B is "1".

After the data transmission device A is powered, or an initial connection starts on the data transmission device A, a signal is sent on channel 1 for only 1 slot, during every 1 cycle (comprising, e.g., 30 slots). Thereafter, channel 2 waits continuously for a maximum of 29 slots to pass.

When the channel 2 signal is received in a slot just behind the slot in which the channel 1 signal was sent, hopping starts. When the channel 2 signal is received in the other slots, waiting is stopped for 29 slots, and waiting of the channel 2 signal begins in the thirtieth slot.

When channel 2 is received in the thirtieth slot, the data in channel 1 is sent in a slot just behind the thirtieth slot, and hopping is started. When channel 2 is not received in a slot of 30 slots, the sending of channel 1 is performed in a slot just behind the thirtieth slot, and waiting at channel 2 is performed for 29 slots.

The relation of channel 1 with channel 2 on the data transmission device B side becomes the reverse of the relation of channel 1 with channel 2 on data transmission device A side. Thus, the same action as that on the data transmission device A side takes place on the data transmission device B side.

Now, assume that an initial connection operation on the data transmission device A side starts later than that on the B side, and that the data transmission device B side receives signals of the data transmission device A side, first, as shown in FIG. 2.

On the data transmission device B side, after the sending of channel 2 is performed, a waiting period occurs at channel 1, and signals associated with channel 1 are received (as depicted by reference "a" in FIG. 2). On the data transmission device B side, sending of data should be performed at the point depicted by reference "b" in FIG. 2. However, at this time, the data can not be sent at the point depicted by reference "b" because the data transmission device B has stopped sending the data since it receives signals associated with channel 1 at the point depicted by reference "a".

Accordingly, in order to receive the next signals associated with channel 1, sending with a cycle up until this time is stopped on the data transmission device B side. After sending signals of channel 2 in a slot just behind the slot after one cycle in which signals of the next channel 1 have been received (depicted by reference "c" in FIG. 2), hopping is started, and an initial transmission is completed. On the data transmission device A side, the response to signals sent from the data transmission device A side is confirmed by the reception of signals of channel 2 in a slot just behind the slot in which signals of channel 1 have been sent (depicted by reference "d" in FIG. 2), and then hopping is started. Thus, the initial reception (connection) is completed.

To summarize the operation of the handshaking operation: (a) After the device is powered or the device starts the handshaking procedure, the device transmits signals with a transmitting channel of the device in a slot, waits for signals from the other device with a receiving channel of the device (e.g., a transmitting channel of the other device) for the successive 29 slots, and repeats a cycle consisting of these 30 slots until the device receives signals from the other device. In addition, the other device does the same operation according to its own cycle. (b) If the device receives signals from the other device, the device stops receiving for 29 slots and waits for next signals from the other device in the 30$^{th}$ slot. If the device succeeds in receiving the next signals from the other device, the device transmits signals just behind the 30$^{th}$ slot, and hopping is started. (c) If the other device receives signals from the device with the receiving channel of the other device just behind the slot in which the other device transmits signals, hopping is started.

Each device performs operation (a) described above. The device that receives signals from the other device earlier performs operation (b) described above, and the device that receives signals from the other device later does operation (c) described above.

According to a communication request, the above procedure is repeated, after a connection confirmation is made, and channel hopping of the SS-FH sending/receiving unit 5A, 5B begins according to the hopping pattern previously set. In this situation, the audio communication between the data transmission device A side and the data transmission device B side becomes possible. Thereafter, the transmission of image signals is started by switching one of the sending/receiving changing switch 6A (on the data transmission device A side) or the sending/receiving changing switch 6B (on the data transmission device B side) to the sending mode. As long as the condition of the connection between the two data transmission devices A and B is maintained, an audio communication between the two devices is possible.

Figure 3:
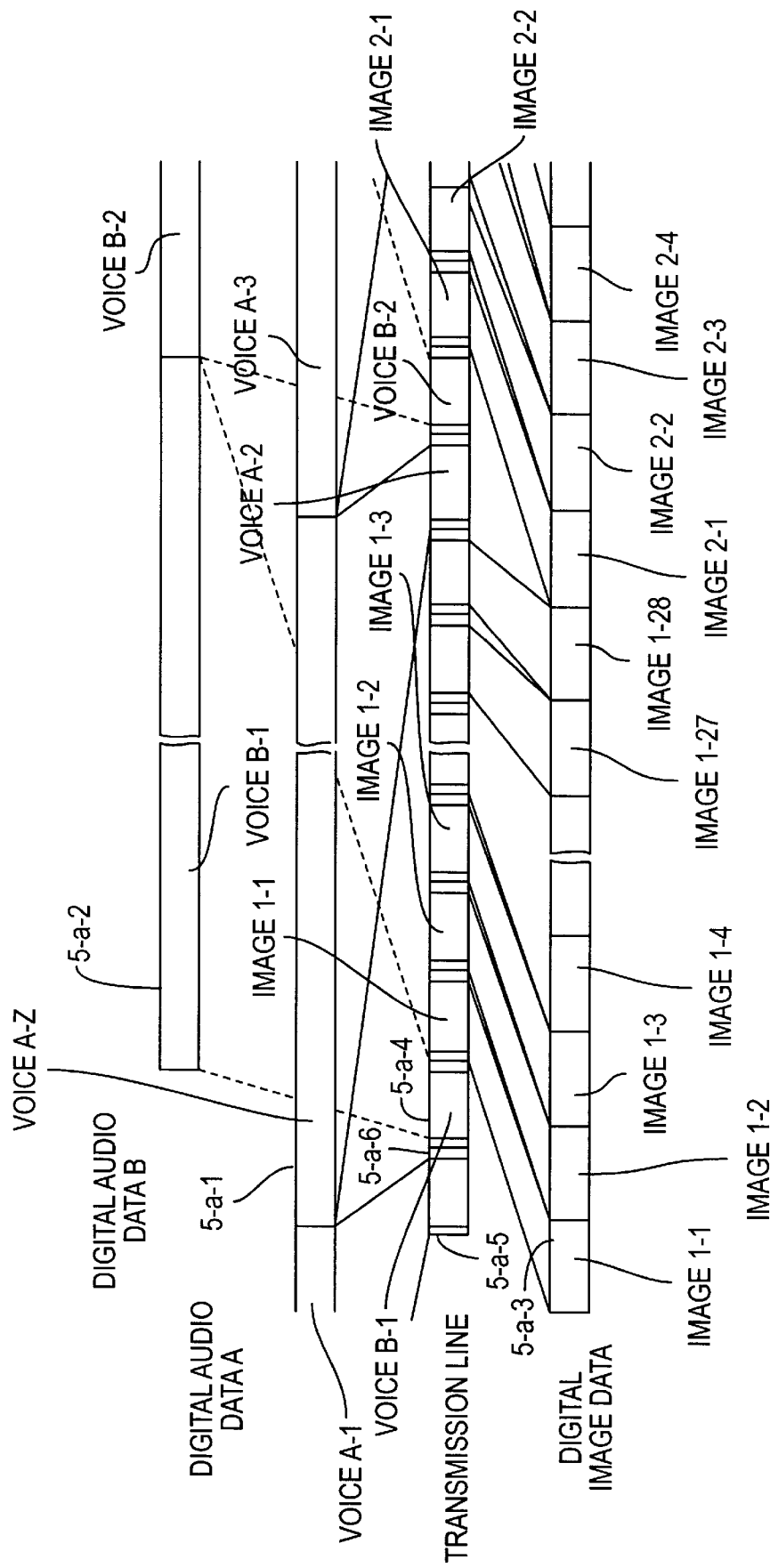
FIG. 3 is a schematic illustration showing the operation of a transmitting side (image sending side) in a packet assemble and de-assemble unit employed in the present invention illustrated in FIG. 1.
Figure 4:
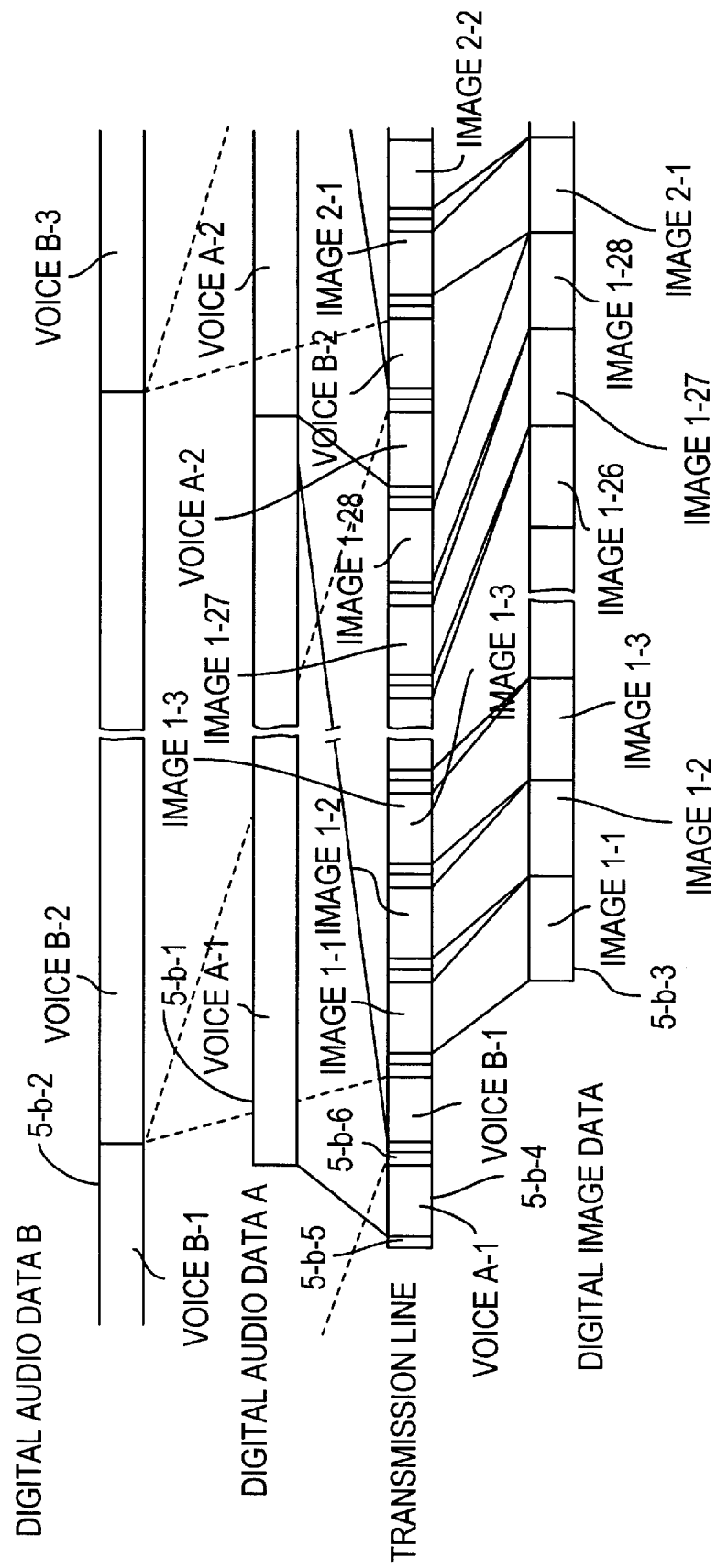
FIG. 4 is a schematic illustration showing the operation of a reception side (image receiving side) in the packet assemble and de-assemble unit.
Figure 5:
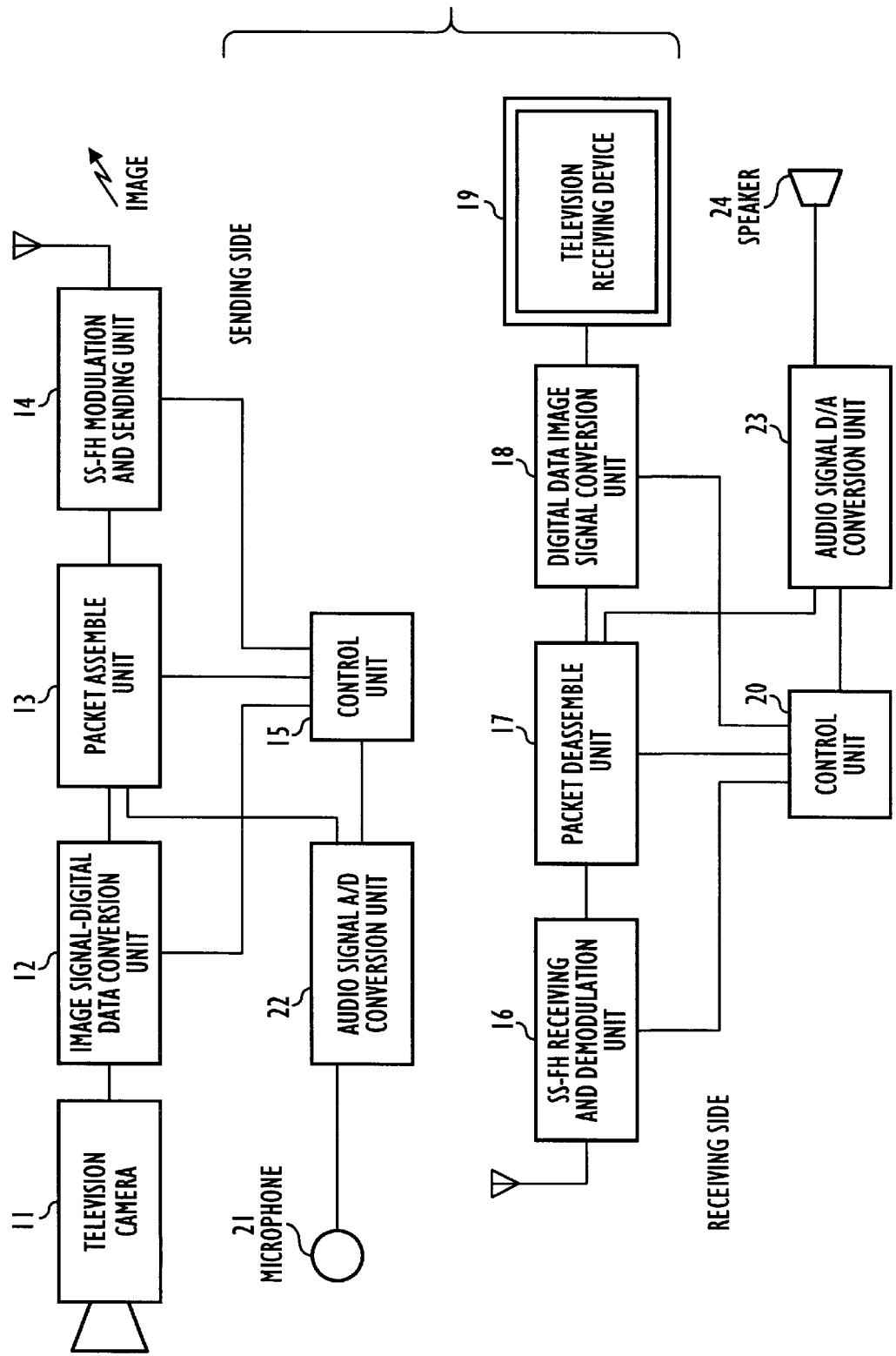
FIG. 5 is a block diagram illustrating a first example of a conventional data transmission device.
Figure 6:
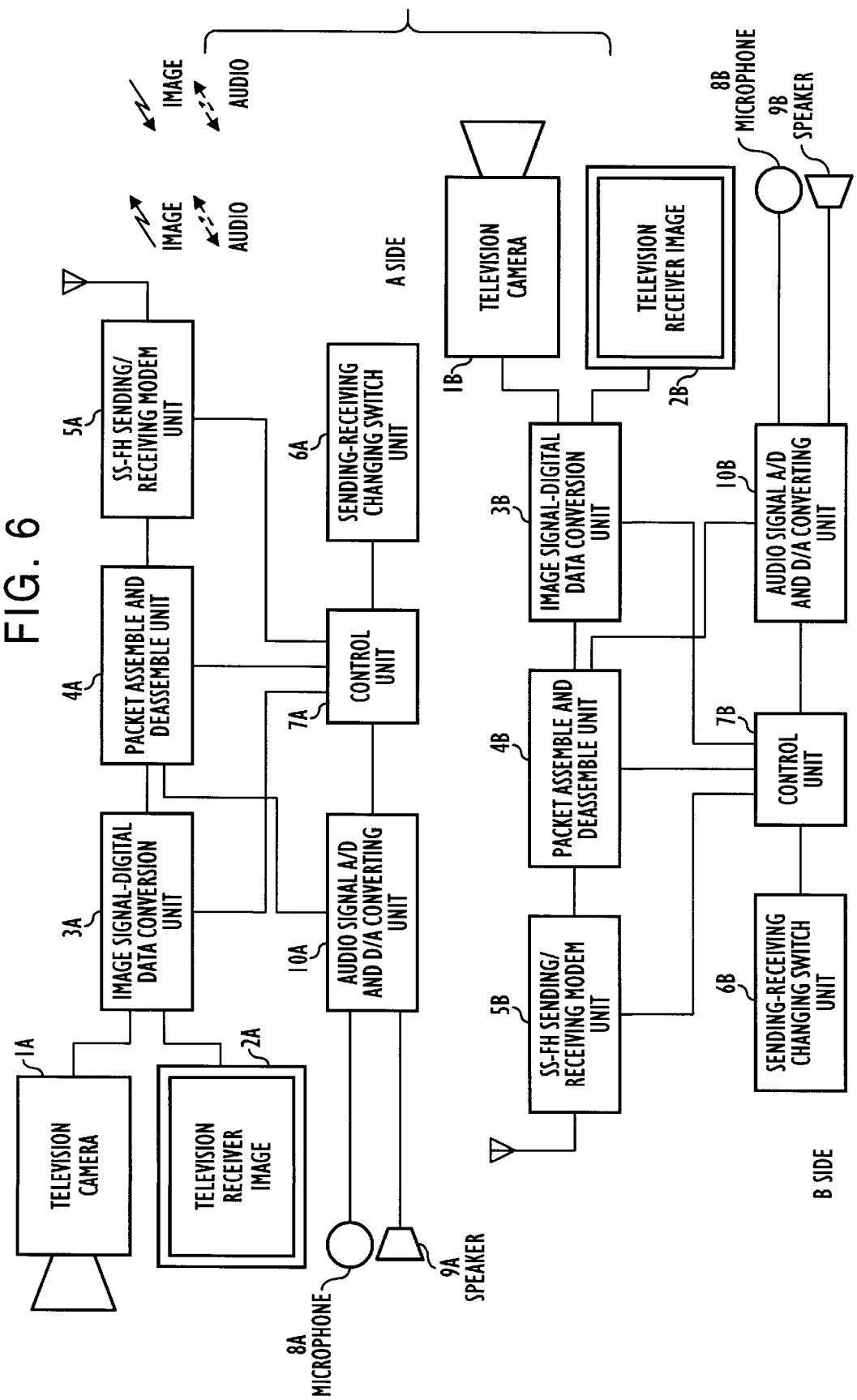
FIG. 6 is a block diagram illustrating a second example of a conventional data transmission device.

FIG. 3 shows the function of a packet assemble and de-assemble unit in the generation side (image sending side) according to the present invention. FIG. 4 is a schematic illustration showing the function of a packet assemble and de-assemble unit in the separation (reception) side (image receiving side).

According to the preferred embodiment, the transmission rate of the transmission line on which the packetized digital audio data and the packetized digital image data are transmitted is 625 kbps. The transmission rate of the audio data is 16 kbps, while the transmission rate of the image data is 448 kbps. However, it is understood that alternative transmission rates may be employed without departing from the spirit and/or scope of the instant invention.

The length of one packet is 3 ms and the number of data bits in one packet is 1875 bits. The number of data bits of a part of audio data or image data is 1440 bits. One circle (i.e., cycle) equals 30 slots. One slot is utilized as an audio slot for the data transmission device A side, one slot is utilized as an audio slot for the data transmission device B side, and twenty-eight slots are used for image slots.

Assume that the data transmission device A in FIG. 1 is configured to operate in an image-sending mode, and the data transmission device B in FIG. 1 is configured to operate in an image-receiving mode. Further, assume that in the initial connection, on the data transmission device A side, data sending is performed in a front audio slot, and on the data transmission device B side, data sending is performed in a back audio slot. According to the above-mentioned condition, FIG. 3 shows the function of the packet assemble and de-assemble unit 4A, and FIG. 4 shows the function of the packet assemble and de-assemble unit 4B.

In FIG. 3, reference "5-a-1" designates digital audio data that is output from the audio signal A/D and D/A converting unit 100A to the packet assemble and de-assemble unit 4A. Reference "5-a-2" designates digital audio data that is output from the packet assemble and de-assemble unit 4A to the audio signal A/D and D/A converting unit 10A. The two data streams comprise continuous digital data at 16 kbps. Reference "5-a-3" designates digital image data that is output from the image signal-digital data conversion unit 3A to the packet assemble and de-assemble unit 4A. The digital image data comprises a continuous digital data at 448 kbps.

Reference "5-a-4" designates a packet string on a transmission line for transmitting packetized digital audio data and packetized digital image data. Audio packet A-n, and image packet n-1 through 28 (where n equals 1, 2, 3 . . . ) are transferred from the packet assemble and de-assemble unit 4A to the SS-FH sending/receiving unit 5A when the SS-FH sending/receiving unit 5A is set to the sending mode (state) by the sending/receiving changing switch 6A. Audio packets B-n (where n equals 1, 2, 3 . . . ) are transferred from the SS-FH sending/receiving unit 5A to the packet assemble and de-assemble unit 4A, when the SS-FH sending/receiving unit 5A is switched to the receiving mode (state) in response to the timing signals issued by the control unit 7A at regular timing intervals.

The switching of the operational mode of the SS-FH sending/receiving unit 5A and hopping channel is performed in synchronization with each packet. Reference "5-a-5" designates the supplemental data, such as a preamble, unique word, calling code and other required signals that are added to the beginning (front) of the digital image data or audio (voice) data when the packets are generated. Reference "5-a-6" designates supplemental data, such as, for example, error-correcting code and other required signals, and hopping channel switching time information that are added to the trailing (back) end of the digital image data or audio data when the packets are generated.

As noted above, FIG. 4 shows the function of the packet assemble and de-assemble unit 4B. In FIG. 4, reference "5-b-1" designates digital audio data that is transferred from the packet assemble and de-assemble unit 4B to the audio signal A/D and D/A converting unit 10B. Reference "5-b-2" designates digital audio data that is transferred from the audio signal A/D and D/A converting unit 10B to the packet assemble and de-assemble unit 4B. The two data streams comprise continuous digital data at 16 kbps.

Reference "5-b-3" designates digital image data that is output from the packet assemble and de-assemble unit 4B to the image signal-digital data conversion unit 3B. The digital data comprises continuous digital data at 448 kbps. Reference "5-b-4" designates a packet string on a transmission line for transmitting packetized digital audio data and packetized digital image data.

The audio packets B-n are transferred from the packet assemble and de-assemble unit 4B to the SS-FH sending/receiving unit 5B when the SS-FH sending/receiving unit 5B is switched to the sending mode (state) in response to the timing signals issued by the control unit 7B at regular timing intervals. Audio packets A-n and image packets n-1 through 28 are transferred from the SS-FH sending/receiving unit 5B to the packet assemble and de-assemble unit 4B when the SS-FH sending/receiving unit 5B is set to the receiving mode (state).

Reference "5-b-5" in FIG. 4 designates the supplemental data, such as, for example, the preamble, unique words, calling code, error-correcting code and other signals, which are added to the leading (front) portion of the digital image data or audio data in the generation of the packets. Reference "5-b-6" designates the supplemental data, such as, for example, the error-correcting code, and hopping channel switching time which are added to the trailing (back) portion of the digital image data or audio data in the generation of the packets.

On the image-sending side (e.g., data transmission device A), the continuous digital image data stream of 448 kbps (shown in FIG. 3) is split into segments of 1440 bits. The split digital image data are compressed to 625 kbps, and necessary data for packetizing are added to the leading (front) and trailing (back) portions of the split digital image data, so that the image data packet is formed as shown by reference "5-a-4" in FIG. 3. On the image-receiving side (e.g., data transmission device B), the data added to the leading and trailing portion of the split data when the generating packets are separated from the image data packet, are shown by reference "5-b-4" in FIG. 4. The image data that has been compressed to 625 kbps is expanded to 448 kbps so that continuous digital image data is reformed. Further, as to the audio (voice) signal, the continuous digital audio data of 16 kbps is split into a plurality of segments, each segment being 1440 bits in length, as shown by reference "5-a-1" in FIG. 3, and reference "5-b-2" in FIG. 4. The split digital audio data is compressed to 625 kbps. Data necessary for packetizing the leading and/or trailing portion of the split digital audio data, so that audio data packets are formed, as indicated by references "5-a-4" or "5-b-4", are modulated and transmitted. Further, as the audio data packets are received and demodulated, the supplemental data that was added to the leading and/or trailing portion of the split digital audio data are separated from the audio data packet, and the audio data compressed to 625 kbps is expanded to 16 kbps so that the continuous digital audio data is reformed. The transmission and reception of audio data packets are thus alternately made between the image-sending side (e.g., data transmission device A) and the image-receiving side (e.g., data transmission device B).

It is noted that a memory can be used for independently writing and reading data in order to perform the necessary data rate conversion (e.g., compression and expansion). Alternatively, other methods may be employed without departing from the spirit and/or scope of the instant invention.

The operation of the present, preferred embodiment will now be explained.

After the respective data transmission devices A and B are powered, data packets corresponding to the audio signal are generated in the packet assemble and de-assemble units 4A and 4B. The packets are then exchanged between the SS-FH sending/receiving units 5A and 5B. The sending of the audio packets are controlled by the control units 7A and 7B. A time period for sending data is one slot within one cycle (30 slots). A time period other than the above-mentioned one slot is reserved for receiving data. For purposes of the present discussion, it is assumed that the content of the audio data is irrelevant. Supplemental data necessary for synchronization, such as, for example, the preamble, unique word and other required data, is added to the audio data, and the sending channel and the receiving channel are set in such a manner that they are able to be received by both data transmission devices A and B.

Assuming that the B side (e.g., data transmission device B) initially receives the signal sent by the data transmission device A side, as shown in FIG. 2, the signal received by the SS-FH sending/receiving unit 5B is demodulated. Thereafter, the demodulated signal is output to the packet assemble and de-assemble unit 4B, in which a synchronous detection is performed. Thereafter, the sending of the audio data packet by a certain cycle, which has been performed until this time on the B side, is stopped, and the sending of data is performed in a slot just behind the slot in which data receiving is performed after one cycle of the A side.

On the A side (e.g., data transmission device A), in a slot just behind the slot in which the sending of the audio packet has been performed, the audio packet from the B side is received and demodulated by the sending/receiving unit 5A. The demodulated signal is then output to the packet assemble and de-assemble unit 4A, in which a synchronous detection is performed. After the synchronous detection on the A side and the B side takes place, control units 7A and 7B start control of hopping.

An initial connection is completed at this time. The audio signals captured by microphones 8A and 8B are converted into digital audio data by the A/D and D/A converting units 10A and 10B, the converted signals are output to the packet assemble and de-assemble units 4A and 4B, and split into segments of 1440 bits. A data rate-conversion is performed to convert the data rate from 16 kbps to 625 kbps. Supplemental data such as, for example, the preamble, unique words, calling code, error correcting code and other necessary signals are added. Further, the audio data packet is formed and modulated with high frequency signals and transmitted by the respective SS-FH sending/receiving units 5A and 5B at respective timing intervals.

The audio data packets modulated with the high frequency signals are received by the other SS-FH sending/receiving unit 5B or 5A. The modulated audio data packets are demodulated to obtain audio data packets, and the supplemental data, such as, for example, the preamble, unique words, calling code, error-correcting code and other necessary signals that were previously added to the audio data packets (in the packet assemble and de-assemble units 4A or 4B) are separated from the audio data packets. The data is then processed using, for example, an error-correcting method, and a data rate conversion from 625 kbps to 16 kbps is performed so that a continuous digital audio data stream is formed. The continuous digital audio data is input to the associated audio signal A/D and D/A converting units 10A or 10B, which outputs an audio signal to be reproduced by associated speaker 9A or 9B. Thus, an audio communication is possible.

A synchronous detection operation is performed in the packet assemble and de-assemble units 4A and 4B for the audio data packets that are output from the SS-FH sending/ receiving units 5A and 5B. The synchronous detection operation functions to detect a unique code in the respective data packets to distinguish audio data packets from image data packets. When the synchronous detection operation does not succeed for a given term (time period), the data transmission devices A and B are set to a state in which the data transmission devices A and B are the beginning of the initial connection. When the initial connection is finished, the sending/receiving changing switches 6A and 6B are then switched to the receiving mode.

Now, assume that the sending/receiving changing switch 6A on the data transmission A side is set to the sending mode in order to transmit image data to the data transmission device B side.

Image signals sent from television camera 1A (of data transmission device A) are digitized and compressed in the image signal-digital data conversion unit 3A to produce a digital image data stream of 448 kbps (in response to control signals issued by the control unit 7A). The converted digital image data output from the image signal-digital data conversion unit 3A is input to the packet assemble and de-assemble unit 4A, where the image data is split into a plurality of segments, each segment being 1440 bits in length. The data rate of the segments are rate-converted from 448 kbps to 625 kbps, supplemental data, such as, for example, a preamble, unique words, calling code, error-correcting code and other necessary signals are added so that the image data packets are formed. The image data packets output from the packet assemble and de-assemble unit 4A are then inputted to the SS-FH sending/receiving unit 5A to be modulated with high frequency signals and transmitted during a predetermined image time slot between the audio slots that have been determined according to signals issued by the control unit 7A.

The image data packets transmitted by the SS-FH sending/receiving unit 5A of the first data transmission device A are received by the SS-FM sending/receiving unit 5B of the second data transmission device B. The received image data packets are demodulated and input to the packet assemble and de-assemble unit 4B, in which the preamble, unique words, calling code, error-correcting code and other necessary signals that were added at the first data transmission device A side are separated. In addition, the 625 kbps data stream is rate-converted to 448 kbps, so that continuous digital image data is formed. The continuous digital image data is input to the image signal-digital data conversion unit 3B, to be expanded, converted to an analog signal, etc., to produce a signal adapted for display on the television receiver 2B.

In the preferred embodiment, image signal-digital conversion units 3A and 3B may employ H261 CODECs (COder-DECoder), and the audio signal A/D and D/A converting units 10A and 10B may employ ADPCM (adaptive differential pulse code modulation) CODECs. H261 CODECs are CODECs that operate according to a method internationally standardized by the CCITT (Comité Consultatif Internationale de Télégraphie et Téléphonie), established as part of the United Nations International Telecommunications Union (ITU). Further, an example of an ADPCM CODEC is manufactured by OKI Electric Industry Co., Ltd. as part number MSM7570. However, it is understood that variations from the above may be made without departing from the spirit and/or scope of the present invention.

In the preferred embodiment of the present invention, signals of images captured by a television camera are converted to digital image data, split into a plurality of segments, rate-converted so that packetized digital image data are formed, and modulated with high frequency signals using a spread spectrum-frequency hopping method to be transmitted from a first location to a second location. The transmitted data is received at the second location, demodulated, packet separated and rate-converted so that continuous digital image data is formed, which is converted into a form suitable for display on a television receiver at the second location.

The sending (transmitting) or reception (receiving) of signals is selectively switched. Each data transmission device A and B comprises microphones for converting a voice into audio signals, speakers for converting the audio signals back to a voice, and audio signal A/D and D/A converting units for A/D converting and D/A converting the audio signals independently of the image transmission. Each data transmission device A and B further comprises a packet assemble and de-assemble unit for generating audio data packets, and a control unit that controls the previously-noted elements. The sending and receiving of audio packets are made using a part of the transmission line, independently of the transmission of the image packet communication. This enables a bi-directional audio communication to take place, so that the state of the image-transmission can be audibly confirmed.

As disclosed hereinabove, according to the present invention, a data transmitting method is disclosed for performing a selective one-way image transmission utilizing a SS-FH transmission scheme, while time slots of bi-directional audio data packets are provided on a part of the transmission line for transmitting audio data packets. Individual packets with a hopping channel of the SS-FH sending and receiving unit are synchronized with the transmission. Further, a bi-directional audio transmission can be performed, independently of the direction of the one way image transmission, by alternately switching the sending and receiving mode. Accordingly, an audio communication is always possible while image signals are being transmitted, and the state of the connection of the data transmission devices can be ascertained.

What is claimed:

1. A method for transmitting a plurality of image data and audio data packets from a first location to a second location, in which a one-directional transmission of an image data packet is performed using a spread spectrum-frequency hopping radio transmission, comprising the steps of:

providing transmission slots for bi-directional audio data packets on part of a transmission line for transmitting image data packets; and using a spread spectrum-frequency hopping sending and receiving device to transmit each of the plurality of audio data packets and image data packets, each packet being synchronized with a hopping channel of the spread spectrum-frequency hopping sending and receiving device, in which a bidirectional audio transmission is performed for predetermined terms in the transmission line, independently of the direction of transmission of the image data packet, by selectively alternating the spread spectrum-frequency hopping sending and receiving device between a sending mode and a receiving mode.

2. A method for transmitting data, in which digital image data is converted into a plurality of image data packets that are transmitted using a spread spectrum-frequency hopping sending and receiving device, comprising the steps of:

converting digital audio data and digital image data into a plurality of data packets; and transmitting the plurality of data packets in synchronization with a hopping channel using the spread spectrum-frequency hopping sending and receiving device, in which a bi-directional audio transmission is performed independently of an image transmission, by alternating a setting of the spread spectrum-frequency hopping sending and receiving device between a sending mode and a receiving mode for a predetermined time period.

3. An apparatus for transmitting data, comprising:

a packet assemble and de-assemble unit that selectively converts digital image data to image data packets, and image data packets to digital image data;

a spread spectrum-frequency hopping sending/receiving unit that selectively modulates and transmits said image data packets, and receives and demodulates modulated image data packets;

a sending/receiving changing switch unit that selectively sets said apparatus to one of a sending mode and a receiving mode; and an audio signal A/D and D/A converting unit that converts audio signals to digital audio data and converts digital audio data to audio signals, said packet assemble and de-assemble unit having facilities for selectively converting said digital audio data to a bi-directional audio data packet and said bi-directional audio data packet to said digital audio data, independently of said transmitting of said image data packets.

4. A data transmission device, comprising:

a camera that captures an image of a subject and outputs an image signal;

an image reproducing device that reproduces an image corresponding to said image signal;

an image signal-digital data conversion unit that one of converts said image signal to digital image data, and converts said digital image data to said image signal;

a packet assemble and de-assemble unit that one of converts said digital image data to an image data packet, and converts said image data packet to said digital image data;

a spread spectrum-frequency hopping sending/receiving unit that one of modulates and transmits said image data packet, and receives and demodulates said modulated image data packets; and a sending/receiving changing switch unit that selectively sets said data transmission device to one of a transmitting mode and a receiving mode, said data transmission device further comprising:

a first converter that converts a sound into an audio signal;

a second converter that converts said audio signal into said sound;

an audio signal A/D and D/A converting unit that converts said audio signal to digital audio data, and converts said digital audio data to said audio signal, wherein said packet assemble and de-assemble unit further converts said digital audio data to a bi-directional audio data packet independently of said image transmission.

5. A data transmission device that transmits data between a plurality of locations, each location having one data transmission device, each data transmission device comprising:

a sending/receiving changing switch unit that sets said data transmission device to one of a transmission mode and a reception mode;

a camera;

an image reproducing device;

an image signal-digital data conversion unit that, in response to a mode setting of said sending/receiving changing switch unit, one of converts and compresses image signals captured by said camera into digital image data, and expands and converts said digital image data to said image signals; and a packet assemble and de-assemble unit that converts said expanded image signals into signals adapted for input to said image reproducing device, wherein said packet assemble and de-assemble unit, in response to one of said transmission mode and said reception mode set by said sending/receiving changing switch unit, selectively generates image data packets from said digital image data sent from said image signal-digital data conversion means, said digital image data being split into a plurality of segments, a transmission rate being converted, supplemental data being added, and continuous digital image data being selectively generated from image data packets which are received and demodulated in a spread spectrum-frequency hopping sending/receiving unit, said supplemental data being separated from said image data packets so that said transmission rate can be converted, said spread spectrum-frequency hopping sending/receiving unit selectively modulating said image data packets from said packet assemble and de-assemble means in response to a mode of operation set by said sending/receiving changing switch unit, transmitting said image data packets using a spread spectrum-frequency hopping transmission scheme, and receiving and demodulating said image data packet modulated with high frequency signals by said spread spectrum-frequency hopping sending/receiving unit;

a control unit that generates clock signals and timing signals required to transmit and receive images, in response to said mode of operation set by said sending/receiving changing switch unit;

a first converter that converts a sound into audio signals;

a second converter that converts said audio signals into said sound;

an audio signal A/D and D/A converting unit that simultaneously converts said audio signals into digital audio data, and said digital audio data into audio signals, respectively, said packet assemble and de-assemble unit further generating and separating audio data packets, said control unit further generating additional signals required for converting said audio signal into said digital audio data, converting said digital audio data to said audio signal, and controlling said generating and separating of said audio data packets.

6. The data transmission device of claim 5, wherein said supplemental data comprises at least one of a preamble, unique word, calling code, and error-correcting code.

7. An apparatus for exchanging data signals, comprising:

means for converting an image signal into a digital image data;

means for converting an audio signal into digital audio data;

means for generating data packets from said digital image data and said digital audio data;

means for transmitting said data packets to another apparatus at a location different from a location of said apparatus; and means for receiving data packets transmitted by said another apparatus, wherein said data packets comprising said digital image data are transmitted in only one direction, while data packets comprising said digital audio data are bi-directionally transmitted, wherein a spread spectrum frequency-hopping scheme is used to exchange data signals, each data packet being synchronized with a hopping channel, a bi-directional audio transmission being performed independently of a direction of transmission of an image data packet.

8. The apparatus of claim 7, further comprising a camera that captures an object of a subject and outputs said image signal corresponding to said captured object.

9. The apparatus of claim 7, further comprising a microphone that captures a voice, said microphone outputting said audio signal corresponding to said voice.

10. The apparatus of claim 7, further comprising a speaker that converts said data packet received by said another apparatus into an audible signal.

11. The apparatus of claim 7, wherein said transmitting means and said receiving means comprise a sending/receiving unit.

12. The apparatus of claim 11, wherein said sending/receiving unit operates in a spread spectrum-frequency hopping mode.

13. The apparatus of claim 7, further comprising a controller that controls operations of said image signal converting means, said audio signal converting means, said data packets generating means, said transmitting means and said receiving means.

14. The apparatus of claim 11, wherein said audio signal converting means further comprises means for converting digital audio data received from said another apparatus into audio data, said data packets generating means further comprising means for separating digital image data and digital audio data from data packets received from said another apparatus.

15. A method for exchanging data between a first apparatus located at a first location and at least one other apparatus located at a location that differs from said first location, comprising the steps of:

packetizing audio data and image data obtained by the first apparatus into data packets;

transmitting the data packets to the at least one other apparatus; and receiving data packets, containing audio data, from the at least one other apparatus so that a two-directional audio communication takes place, wherein a spread spectrum frequency-hopping scheme is used to exchange data signals, in which each packet is synchronized with a hopping channel, a bi-directional audio transmission being performed independently of a direction of transmission of the packetized image data.

16. The method of claim 15, wherein the step of transmitting data packets comprises transmitting data packets using a spread-spectrum-frequency hopping transmission scheme.

17. The method of claim 16, wherein the data packets transmitting step comprises using a spread spectrum-frequency hopping modem.

18. The method of claim 15, further comprising the steps of:

using a microphone to capture a spoken voice and output the audio data; and using a speaker to reproduce the audio data received from the at least one other apparatus.

19. The method of claim 15, further comprising the step of selectively switching the apparatus between a transmission mode and a reception mode at predetermined time slots so that the data packets, containing audio data, may be received while the packetized audio data and image data are transmitted by the apparatus.

20. The method of claim 15, further comprising the steps of:

converting the image data into digital image data; and converting the audio data into digital audio data, wherein the digital image data and digital audio data are packetized into the data packets.

\* \* \* \* \*